United States Patent
Gummow et al.

(10) Patent No.: US 11,555,249 B2
(45) Date of Patent: Jan. 17, 2023

(54) APPARATUS FOR MEASURING A CATHODIC PROTECTION CONDITION OF A BURIED STEEL STRUCTURE, AND METHOD

(71) Applicant: Corrosion Service Company Limited, Markham (CA)

(72) Inventors: Robert Gummow, Markham (CA); Daniel Fingas, Markham (CA); Hycem Bahgat, Markham (CA)

(73) Assignee: Corrosion Service Company Limited

( * ) Notice: Subject to any disclaimer, the term of this patent is extended or adjusted under 35 U.S.C. 154(b) by 193 days.

(21) Appl. No.: 16/431,799

(22) Filed: Jun. 5, 2019

(65) Prior Publication Data

US 2019/0368054 A1    Dec. 5, 2019

Related U.S. Application Data

(60) Provisional application No. 62/680,631, filed on Jun. 5, 2018.

(51) Int. Cl.
*C23F 13/22*    (2006.01)
*G01N 17/04*    (2006.01)
*G01N 17/02*    (2006.01)

(52) U.S. Cl.
CPC ............ *C23F 13/22* (2013.01); *G01N 17/02* (2013.01); *G01N 17/043* (2013.01)

(58) Field of Classification Search
CPC ........ C23F 13/22; G01N 17/02; G01N 17/04; G01N 17/043; G01N 17/046
See application file for complete search history.

(56) References Cited

U.S. PATENT DOCUMENTS

| | | | | |
|---|---|---|---|---|
| 4,752,360 A | * | 6/1988 | Jasinski | G01N 17/02 205/776.5 |
| 2005/0006250 A1 | * | 1/2005 | Russell | G01N 17/043 205/725 |
| 2009/0158827 A1 | * | 6/2009 | Dermody | G01N 17/043 73/86 |
| 2009/0321280 A1 | * | 12/2009 | Kimble | G01N 17/02 205/790.5 |
| 2015/0198518 A1 | * | 7/2015 | Borin | G01N 17/02 205/775.5 |
| 2015/0268153 A1 | * | 9/2015 | Johannes Jacobus Maria | G01N 17/04 205/775.5 |
| 2017/0328828 A1 | * | 11/2017 | Goh | C23F 13/10 |
| 2020/0271617 A1 | * | 8/2020 | Jones | G01N 27/49 |

* cited by examiner

*Primary Examiner* — David M Schindler
(74) *Attorney, Agent, or Firm* — Renner Kenner Greive Bobak Taylor & Weber

(57) ABSTRACT

A probe for measuring a cathodic protection condition of a buried steel structure includes: a steel electrode; a reference electrode; and a coupon fabricated of a conductive material. The steel electrode, the reference electrode and the conductive coupon are positioned in an ionically conductive medium in proximity with each other and are isolated from direct electrical contact with each other.

20 Claims, 12 Drawing Sheets

APPARATUS FOR MEASURING A CATHODIC PROTECTION CONDITION OF A BURIED STEEL STRUCTURE, AND METHOD

CROSS-REFERENCE TO RELATED APPLICATION

This application claims the benefit of U.S. Provisional Application No. 62/680,631 filed on Jun. 5, 2018, the content of which is incorporated herein by reference in its entirety.

FIELD

The present invention relates generally to corrosion protection and in particular, to an apparatus for measuring a cathodic protection condition of a buried steel structure, and a method.

BACKGROUND

Corrosion of metal is a well-known phenomenon, and occurs when the metal gives up electrons by electrochemical reactions with its surrounding environment. Such corrosion can be prevented by forcing electrons into the metal from an external power source so as to deliberately lower the potential of the metal relative to its environment.

One commonly used approach to achieve this is impressed current cathodic protection, whereby an electromotive force (EMF) is used to provide electrons directly to a metal structure in its operating environment. This results in a "polarized potential" of the metal structure relative to the operating environment, which prevents the metal structure from serving as a source of electrons that would otherwise be required for the electrochemical reactions to proceed.

In the case of buried steel structures, such as pipelines, industry standards typically require measurement of the polarized potential as a way of inferring the corrosion condition of the structure. However, the corrosion condition can be difficult to determine accurately using the polarized potential alone. One reason for this is that, under aerated electrolytic conditions, the polarized potential has only a weak correlation with cathodic protection current density, suggesting a decoupling between the polarized potential and the corrosion prevention mechanism.

When cathodic protection current is applied to a steel structure, current is transferred across the structure/electrolyte interface (namely, the interface between the exposed steel surface and the surrounding soil) by one or more reduction reactions, depending on the environmental conditions at the interface and the magnitude of the current density. For steel, the common reduction reactions are:

$$H^+ + e^- \rightarrow H° \quad (1)$$

$$2H_2O + O_2 + 4e^- \rightarrow 4OH^- \quad (2)$$

$$2H_2O + 2e^- \rightarrow H_2 + 2OH^- \quad (3)$$

Equation (1) describes hydrogen ion reduction in either an unaerated environment or a low pH environment; equation (2) describes dissolved oxygen reduction in an aerated environment; and equation (3), also known as the "hydrogen line", describes the electrolysis of water. The reduction reactions described by equations (1) to (3) result in an increase in the concentration of $OH^-$ ions at the structure/electrolyte interface, and a proportionate increase in pH. The relationship between the polarized potential of steel and pH can be illustrated by a potential-pH diagram, shown in FIG. 1.

When steel is polarized by a cathodic protection current in the negative direction, the polarized potential cannot normally be forced more negative than 80 mV past the "hydrogen line", along which the electrolysis of water and the evolution of hydrogen gas occur. Increasing the cathodic protection current density results in an increase in pH, whereby an increase in a single pH unit generally requires a disproportionately larger increase in cathodic protection current density. When the polarized potential of steel, E, resides on the hydrogen line, the polarized potential and the interfacial pH are linearly related by the following equation:

$$E = -316 \, mV_{cse} + (-59 \, mV \times pH) \quad (4)$$

As will be understood, when the polarized potential resides on the hydrogen line, the pH value at the interface between the exposed steel surface and the soil may be calculated using the pH-potential difference calibration curve described by equation (4), and using the measured potential difference as the polarized potential, E.

However, in aerated electrolytic environments, the polarized potential and interfacial pH are not linearly related, because the structure/electrolyte potential does not meet the hydrogen line until the cathodic protection current density exceeds the limiting current density for oxygen reduction, $i_L$. This situation was illustrated by cathodic polarization tests carried out in simulated groundwater solutions, in "Fundamental Processes of Cathodically Protecting Steel Pipelines", Gas Research Conference Proceedings (1983), authored by Thompson and Barlo. FIG. 2 shows the results of these tests.

Argon saturation of electrolytic environments is known to remove dissolved oxygen to yield a unaerated electrolytic environment, in which the structure/electrolyte potential is linearly related to the logarithm of applied current density. This linear relationship is the hydrogen line. As can be seen in FIG. 2, increasing the structure/electrolyte potential by 100 mV requires a disproportionately large increase in cathodic protection current density. A comparison of this data with FIG. 1 indicates that there is a direct proportional relationship between pH and the logarithm of current density, similar to the linear relationship between polarized potential and interfacial pH along the hydrogen line.

For an aerated condition of 20% $O_2$ (where 100% $O_2$ would be equivalent to about 8 ppm of dissolved oxygen), the polarized potential is known to not indicate the interfacial pH until the limiting current density for oxygen reduction ($i_L$) is reached at a current density of about $10^{-4}$ A/cm². The limiting current density is known to increase with increasing dissolved oxygen concentration in the electrolyte.

Achieving consistently accurate measurements for all electrolytic environments experienced by a pipeline would provide greater confidence to regulators, insurers and the general public that the pipeline operator's structural integrity efforts are effective.

It is therefore an object at least to provide a novel apparatus for measuring a cathodic protection condition of a buried steel structure, and a method.

SUMMARY

It should be appreciated that this summary is provided to introduce a selection of concepts in a simplified form that are further described below in the detailed description. This summary is not intended to be used to limit the scope of the claimed subject matter.

In one aspect, there is provided a probe for measuring a cathodic protection condition of a buried steel structure, the probe comprising: a steel electrode; a reference electrode; and a coupon fabricated of a conductive material, the steel electrode, the reference electrode and the conductive coupon being positioned in an ionically conductive medium in proximity with each other and isolated from direct electrical contact with each other.

The conductive coupon may be fabricated of a conductive material that exhibits potential-pH behavior that is insensitive to an amount of oxygen present. The conductive coupon may be fabricated of a conductive material selected from the group consisting of: antimony; antimony alloys; tungsten; and tungsten alloys.

The reference electrode may be selected from the group consisting of a zinc electrode, a copper-copper sulfate electrode (CSE), a saturated calomel electrode (SCE), and a silver-silver chloride electrode.

The probe may further comprise an elongate, hollow non-conductive body, wherein the steel electrode is disposed on an end of the body. The body may accommodate a portion of the ionically conductive medium, and wherein the reference electrode is positioned in the ionically conductive medium in the interior of the body. The reference electrode may be positioned exterior to the body. The steel electrode may have at least one of i) an aperture, and ii) a plug fabricated of a porous material, for providing electrolytic communication between the conductive medium and an exterior of the probe. A portion of the conductive coupon may be sheathed by an insulating bushing, the bushing being accommodated in an aperture formed in the steel electrode. The conductive coupon may be mounted on a bracket, the conductive coupon being spaced from the steel electrode by a fixed distance.

In another aspect, there is provided an apparatus for measuring a cathodic protection condition of a buried steel structure, the apparatus comprising: a probe buried adjacent the steel structure, the probe comprising: a steel electrode, a reference electrode positioned in proximity to the steel electrode, and a coupon fabricated of a conductive material, the steel electrode, the reference electrode and the conductive coupon being positioned in an ionically conductive medium in proximity with each other and isolated from direct electrical contact with each other; and a potential difference measurement device in electrical communication with the reference electrode, and with one of: the steel electrode, and the conductive coupon.

The potential difference measurement device may be in electrical communication with each of the steel electrode and the conductive coupon by a respective interruptible means. Each respective interruptible means may be a mechanical switch. The probe may be in electrical communication with the buried steel structure by a respective interruptible means. The steel electrode may be in electrical communication with the buried steel structure by the interruptible means.

The potential difference measurement device may be accommodated in an enclosure on a ground surface near the buried pipeline and the buried probe. Insulated wires may extend to the potential difference measurement device from each of the steel electrode, the reference electrode, and the conductive coupon.

The conductive coupon may be fabricated of a conductive material that exhibits potential-pH behavior that is insensitive to an amount of oxygen present.

In another aspect, there is provided a method of measuring a cathodic protection condition of a buried steel structure receiving a cathodic protection current, the method comprising: electrically connecting the steel structure to a steel electrode of a probe buried adjacent the steel structure; and with electrical connection between the steel structure and the steel electrode temporarily interrupted, measuring the potential difference between a reference electrode positioned in proximity to the steel electrode and one of: the steel electrode, and a conductive coupon fabricated of a conductive material and positioned in proximity to the steel electrode, the steel electrode, the reference electrode and the conductive coupon being positioned in an ionically conductive medium and isolated from direct electrical contact with each other.

The method may further comprise: after said measuring, electrically connecting the steel structure to the steel electrode.

The method may further comprise: determining cathodic protection effectiveness of the steel structure by the comparing potential difference measured between the reference electrode and the steel electrode to one or more industry standard values.

The method may further comprise: determining pH at an interface between a surface of the steel structure and the conductive medium by comparing the potential difference measured between the reference electrode and the conductive coupon to potential-pH calibration data for the conductive coupon.

BRIEF DESCRIPTION OF THE DRAWINGS

Embodiments will now be described more fully with reference to the accompanying drawings in which.

DETAILED DESCRIPTION OF EMBODIMENTS

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including by not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of description to describe the relationship of an element or feature to another element or feature as illustrated in the figures. The spatially relative terms can however, encompass different orientations in use or operation in addition to the orientation depicted in the figures.

Figure 1:
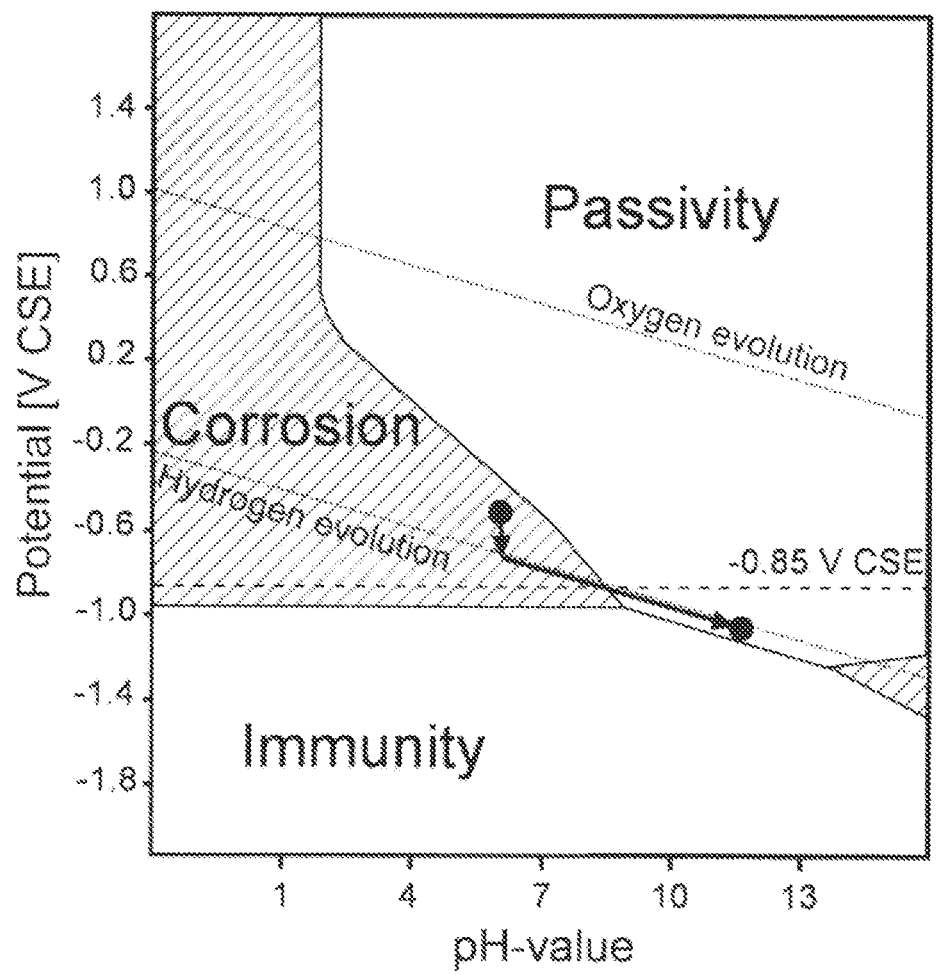
FIG. 1 is a graphical plot of cathodic potential as a function of pH at an interface between a steel structure and a surrounding electrolyte.
Figure 2:
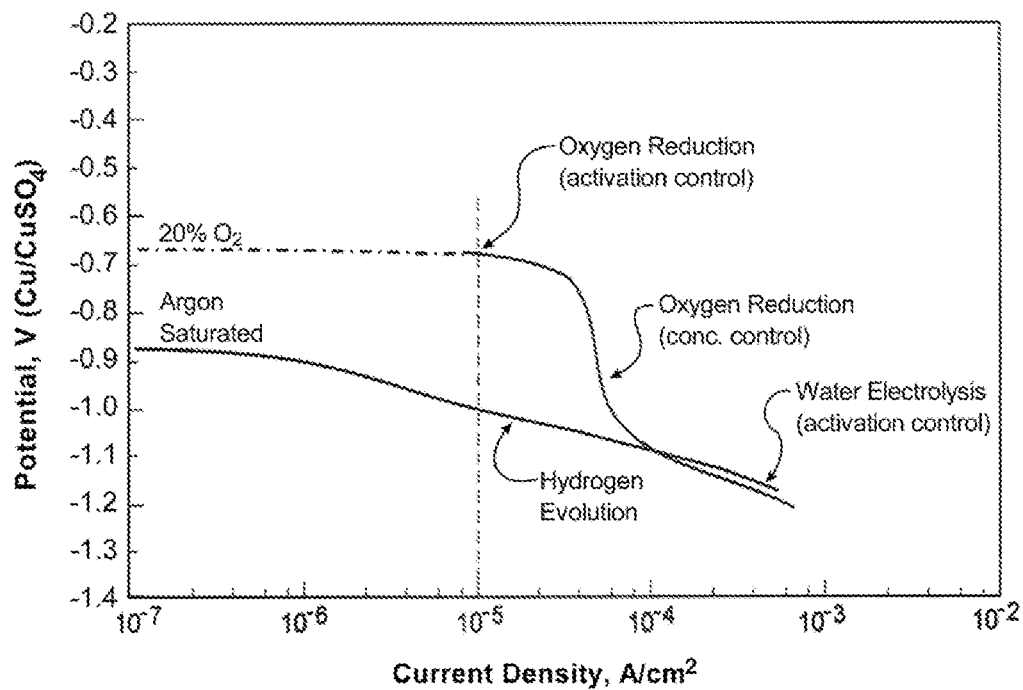
FIG. 2 is a graphical plot of cathodic potential as a function of current density for an exemplary cathodically-polarized steel structure, in deaerated and 20% aerated aqueous solutions at pH 7.
Figure 3:
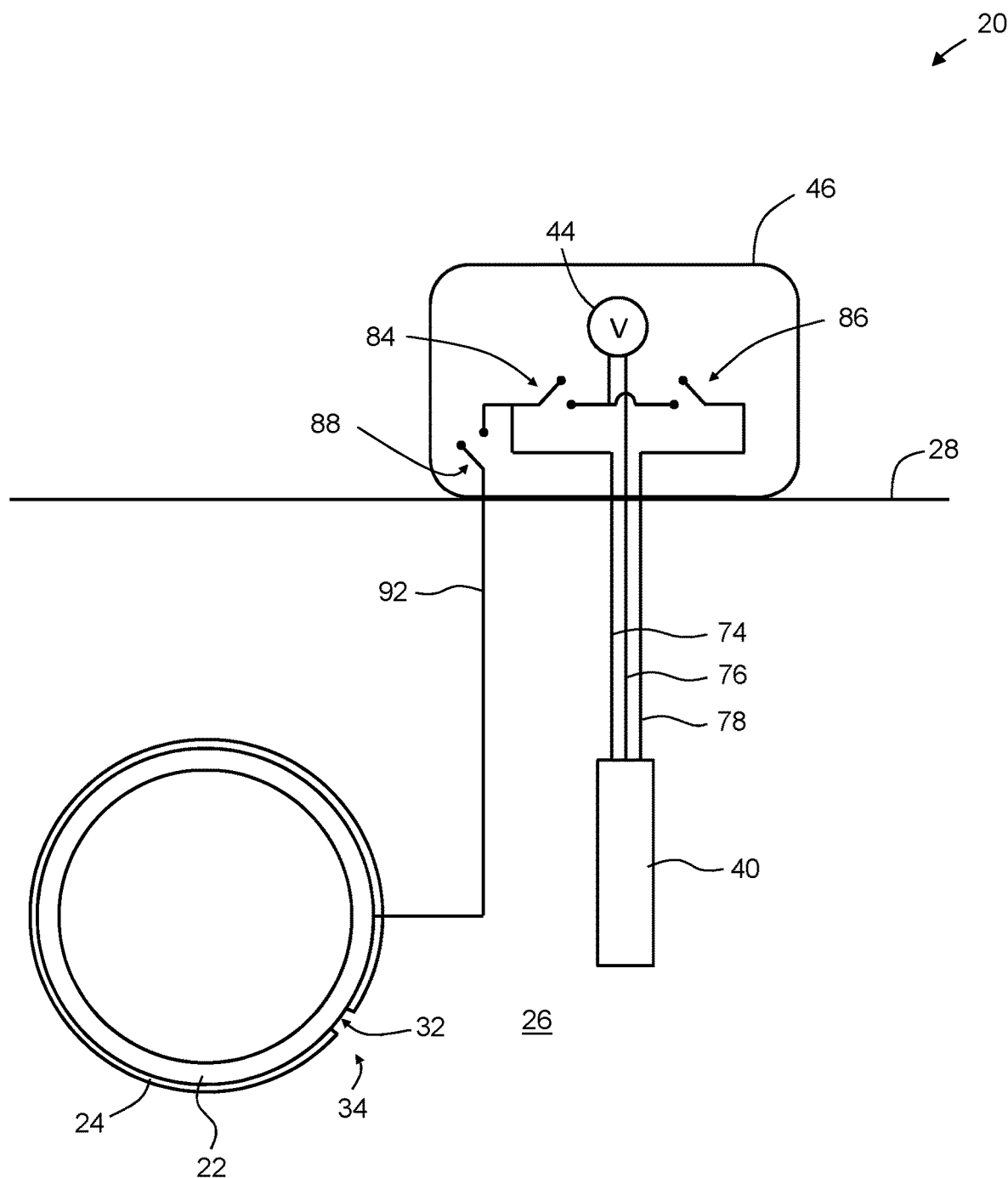
FIG. 3 is a schematic view of an apparatus for measuring a cathodic protection condition of a buried steel structure.

Turning now to FIG. 3, an apparatus for measuring a cathodic protection condition of a buried steel structure is shown and is generally indicated using reference numeral 20. In particular, apparatus 20 is configured to measure the cathodic protection condition of a buried steel structure 22 that is being cathodically protected by an impressed current cathodic protection (ICCP) device (not shown). In the example shown, the buried steel structure 22 is a pipeline covered with a polymer coating 24, and is buried in soil 26 below grade 28. Also in the example shown, the buried steel structure 22 has an exterior surface 32 that is exposed to soil 26 at a coating defect 34, which is in the form of a hole in the polymer coating 24. It will be understood however that the apparatus 20 is not limited to use with pipelines, and may alternatively be used with other buried steel structures, or with underwater steel structures, that are being cathodically protected by either an ICCP device or a galvanic cathodic protection arrangement. As will be understood, underwater steel structures are submerged in an electrolytic medium of seawater or freshwater, and are thereby effectively buried.

The apparatus 20 comprises a probe 40 that is permanently buried in soil 26 adjacent the steel structure 22. The probe 40 is in electrical communication with a potential difference measurement device 44, which in the example shown is housed in an enclosure 46 that is situated on grade 28 near the steel structure 22. The enclosure 46 and the potential difference measurement device 44 therein are accessible to workers, and in the example shown, the potential difference measurement device 44 is a voltmeter.

Figure 4:
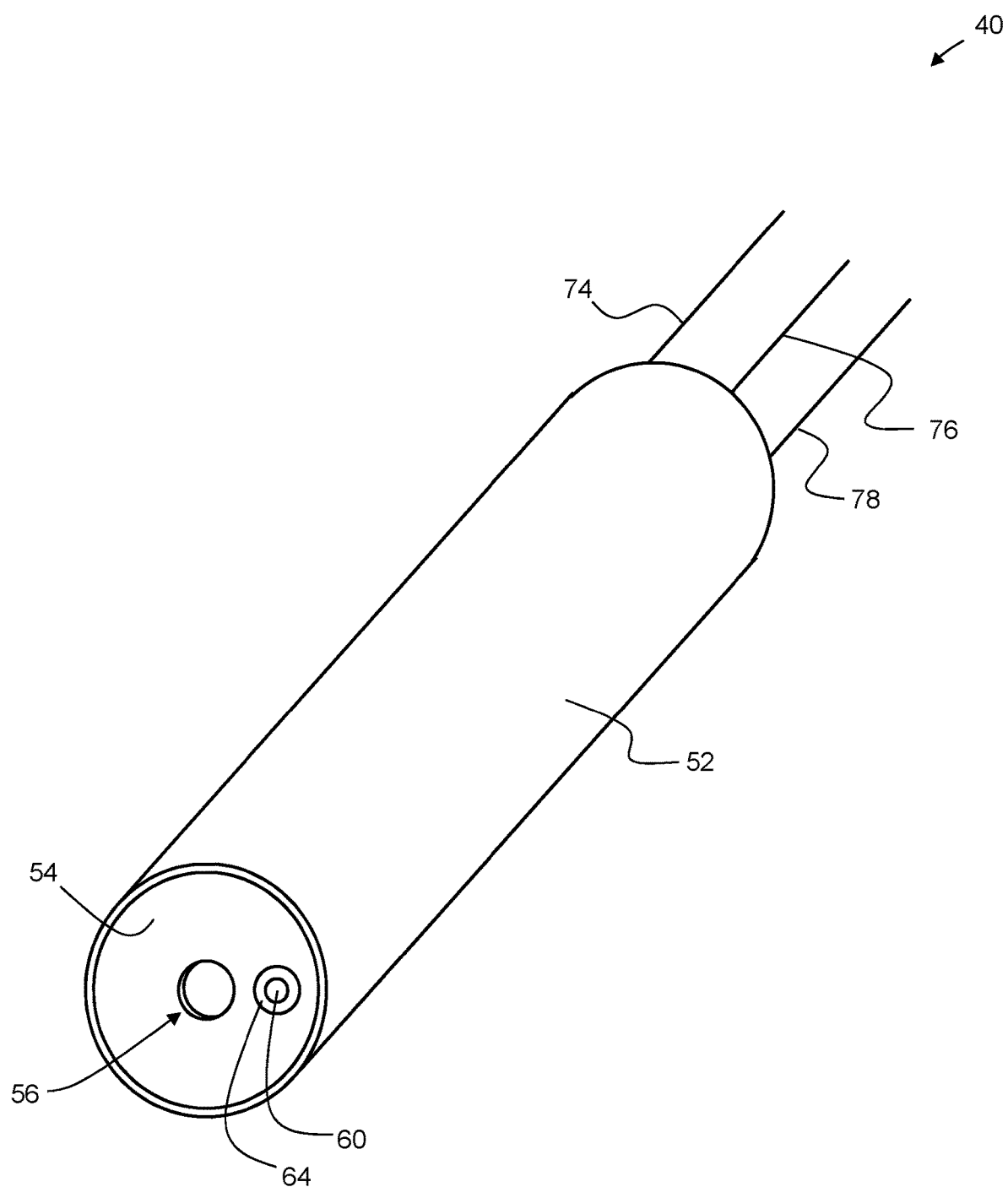
FIG. 4 is a perspective view of a probe forming part of the apparatus of FIG. 3.
Figure 5:
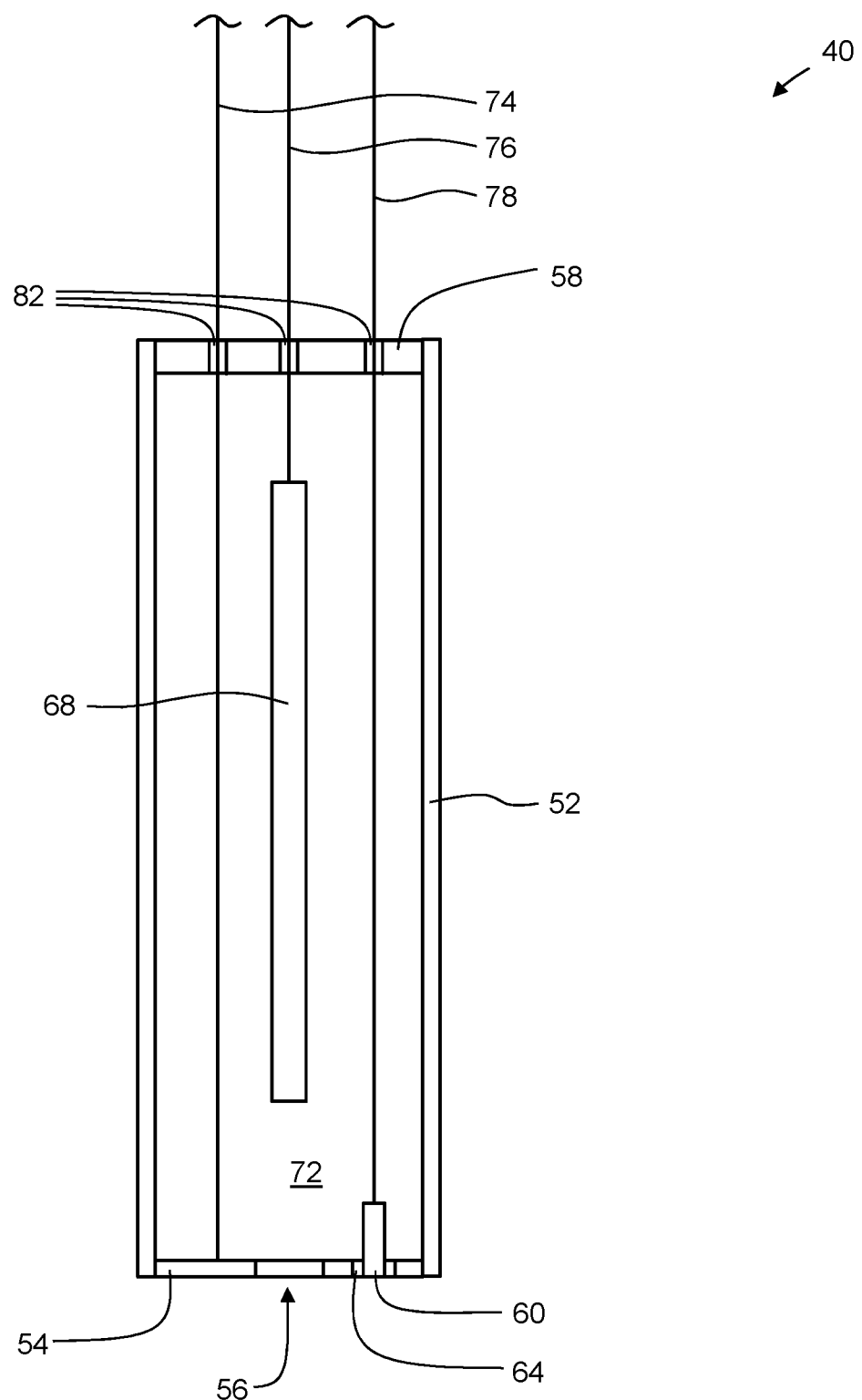
FIG. 5 is a sectional view of the probe of FIG. 4.

The probe 40 may be better seen in FIGS. 4 and 5. Probe 40 comprises an elongate, hollow body 52 that is fabricated of a non-conductive material, and in this embodiment the body 52 is fabricated of polyvinyl chloride (PVC). The body 52 has a first end into which is fitted a steel electrode 54 in the general form of a disc. The steel electrode 54 is sized to have an exterior surface having an area that is generally commensurate with the area of a typical coating defect on the surface of the steel structure 22, such as coating defect 34. The steel electrode 54 has a central aperture 56 formed therein. The body 52 has a second end that is sealed with a plug 58 fabricated of a non-conductive material, and in this embodiment the plug 58 is fabricated of polyvinyl chloride (PVC).

The probe 40 also comprises a conductive coupon 60 that is positioned adjacent the steel electrode 54, and that has a surface exposed to the exterior of the probe 40. The conductive coupon 60 is fabricated of a conductive material that exhibits potential-pH behavior that is insensitive to the amount of oxygen present. In this embodiment, the conductive coupon 60 is fabricated of antimony (Sb) or an alloy thereof, but may alternatively be fabricated of tungsten (W) or an alloy thereof, or of another suitable material. In the embodiment shown, the conductive coupon 60 is partially sheathed by an insulating bushing 64 accommodated in an aperture formed in the steel electrode 54, such that the conductive coupon 60 is isolated from direct electrical contact with the steel electrode 54. The insulating bushing 64 is fabricated of a dielectric material, such as polymer. The conductive coupon 60 and the steel electrode 54 are in proximity with each other, such that the conductive coupon 60 and the steel electrode 54 are less than about ten (10) mm from each other, and preferably within about one (1) to about two (2) mm from each other.

The probe 40 further comprises a reference electrode 68 positioned in the interior of the body 52, away from direct electrical contact with the steel electrode 54 and the conductive coupon 60. In this embodiment, the reference electrode 68 is in the form of a zinc (Zn) "pseudo reference" electrode. The interior of the body 52 is filled with an ionically conductive medium 72, which surrounds the reference electrode 68 and which is in electrolytic communication with the soil 26 surrounding the probe 40 via the aperture 56 formed in the steel electrode 54, and with each of the steel electrode 54 and the conductive coupon 60. In this embodiment, the ionically conductive medium 72 is a blend of bentonite, gypsum and sodium sulfate ($Na_2SO_4$). The conductive coupon 60, the steel electrode 54 and the reference electrode 68 are in proximity with each other, such that the conductive coupon 60, the steel electrode 54 and the reference electrode 68 are in electrolytic communication with each other.

The probe 40 has an insulated first wire 74 that is electrically connected to the steel electrode 54, an insulated second wire 76 that is electrically connected to the reference electrode 68, and an insulated third wire 78 that is electrically connected to the conductive coupon 60. Each of the first wire 74, the second wire 76 and the third wire 78 extends out of the probe 40 through a respective sealed fitting 82 in the plug 58.

The potential difference measurement device 44 is electrically connected to the reference electrode 68 via the second wire 76 extending from the probe 40. The potential difference measurement device 44 is electrically connectable to the steel electrode 54 via a first interruptible element 84, which is housed in the enclosure 46 and which is connected to the first wire 74. The potential difference measurement device 44 is electrically connectable to the conductive coupon 60 via a second interruptible element 86, which is housed in the enclosure 46 and which is connected to the third wire 78.

The probe 40 is also electrically connectable to the steel structure 22 via a third interruptible element 88, which is housed in the enclosure 46 and which is connected to an insulated fourth wire 92 connected to the surface 32 of the steel structure 22 through the polymer coating 24. The third interruptible element 88 is also connected to the second wire 76 that is electrically connected to the steel electrode 54.

In the example shown, each of the first interruptible element 84, the second interruptible element 86, and the third interruptible element 88 is a manually-operated switch. However, it will be appreciated that one or more of the first interruptible element 84, the second interruptible element 86, and the third interruptible element 88 may alternatively be a remotely-operated switch or an automated switch, and may for example be in the form of an electronic relay.

In use, when the probe 40 is not being used for measurement, the apparatus 20 is placed into a "non-measurement" configuration, whereby the first interruptible element 84 and the second interruptible element 86 are opened, and the third interruptible element 88 is closed. In this configuration, the steel electrode 54 of the probe 40 is in electrically connected to the steel structure 22, which allows cathodic protection current being applied to the steel structure 22 by the ICCP device to flow to the steel electrode 54. As will be understood, the cathodic protection current alters the electrolytic conditions in the vicinity of the probe 40, and thereby creates an electrolytic environment in the vicinity of each of the steel electrode 54 and the conductive coupon 60 that mimics the electrolytic environment at the interface between the surface 32 of the steel structure 22 and soil 26 at the coating defect 34.

When the probe 40 is used for measurement, the apparatus 20 is placed into a "measurement" configuration, whereby the third interruptible element 88 is opened, and either the first interruptible element 84 or the second interruptible element 86 is closed. In this configuration, when the second interruptible element 86 is opened and the first interruptible element 84 is closed, the potential difference measurement device 44 is configured to measure the potential difference between the steel electrode 54 and the reference electrode 68, $E_S$. The measured potential difference $E_S$ can be directly compared to one or more industry standard values to determine cathodic protection effectiveness of the buried steel structure 22. When the first interruptible element 84 is opened and the second interruptible element 86 is closed, the potential difference measurement device 44 is configured to measure the potential difference between the conductive coupon 60 and the reference electrode 68, $E_C$. As the conductive coupon 60 is fabricated of a conductive material that exhibits potential-pH behavior that is insensitive to the amount of oxygen present, the measured potential difference $E_C$ can be used to estimate the pH at the interface between the surface 32 of the steel structure 22 and soil 26 at the coating defect 34, through comparison of the measured value of potential difference $E_C$ to potential-pH calibration data for the conductive coupon 60.

Figure 6:
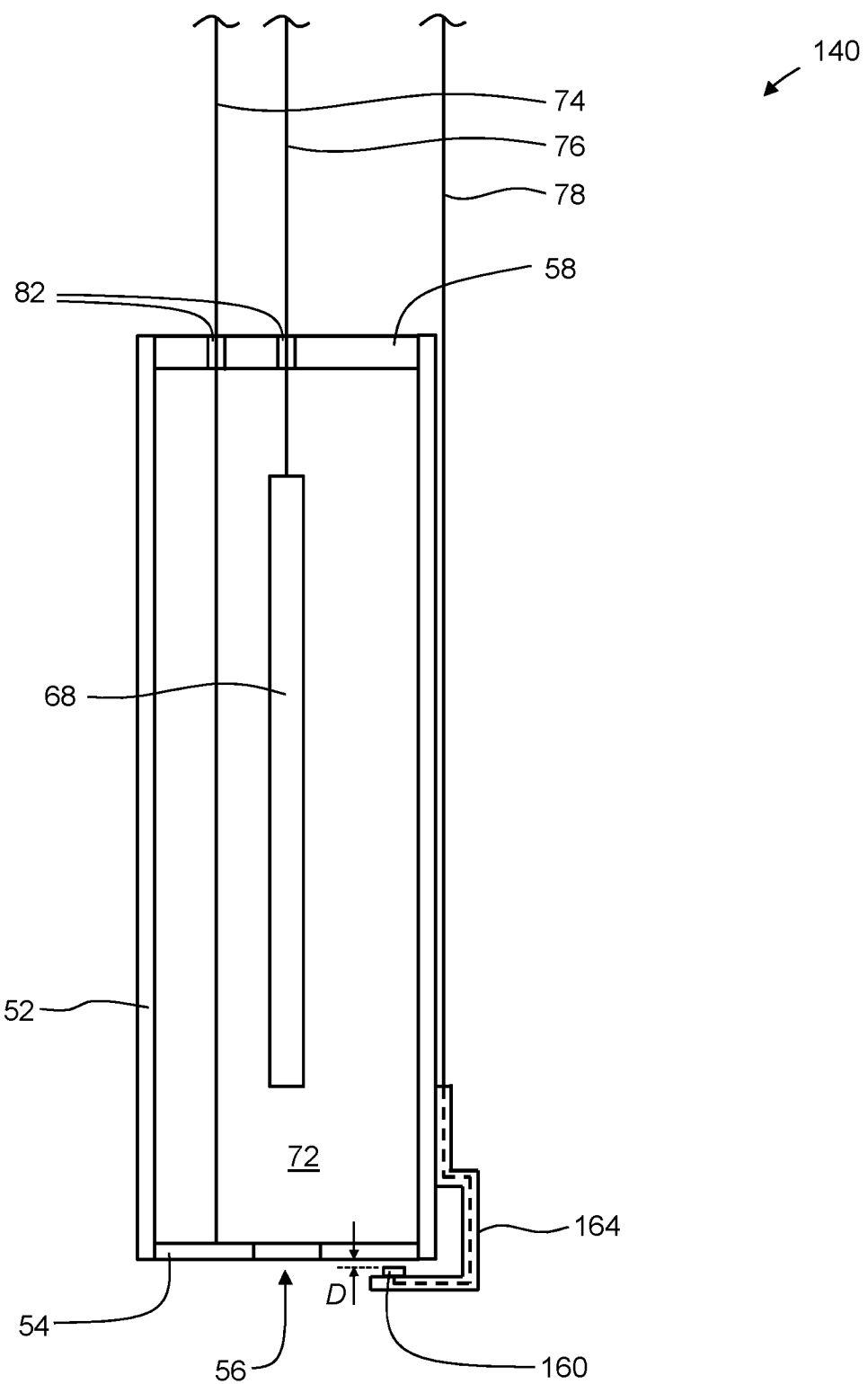
FIG. 6 is a sectional view of another embodiment of a probe forming part of the apparatus of FIG. 3.

The probe is not limited to the configuration described above, and in other embodiments, the other configurations may alternatively be used. For example, FIG. 6 shows another embodiment of a probe, which is generally indicated by reference numeral 140. Probe 140 is similar to probe 40 described above and with reference to FIGS. 4 and 5, but comprises a conductive coupon 160 that has a surface exposed to the exterior of the probe 140, and is separated from the steel electrode 54 by a fixed distance, D. Similar to conductive coupon 60 of probe 40, the conductive coupon 160 is fabricated of a conductive material that exhibits potential-pH behavior that is insensitive to the amount of oxygen present. In this embodiment, the conductive coupon 160 is fabricated of antimony (Sb) or an alloy thereof, but may alternatively be fabricated of tungsten (W) or an alloy thereof, or of another material. In this embodiment, the conductive coupon 60 is mounted on a hollow insulating bracket 164 that is fastened to the body 52 of the probe 140, such that the conductive coupon 160 is isolated from direct electrical contact with the steel electrode 54 by virtue of separation distance D. The insulating bracket 164 is fabricated of a dielectric material, such as polymer. The conductive coupon 160 and the steel electrode 54 are in proximity with each other, such that the conductive coupon 160 and the steel electrode 54 are less than about ten (10) mm from each other, and preferably within about one (1) to about two (2) mm from each other. The probe 140 has an insulated third wire 78 that is electrically connected to the conductive coupon 160, and in the example shown a portion of the insulated third wire 78 is housed in the interior of the insulating bracket 164.

Figure 7:
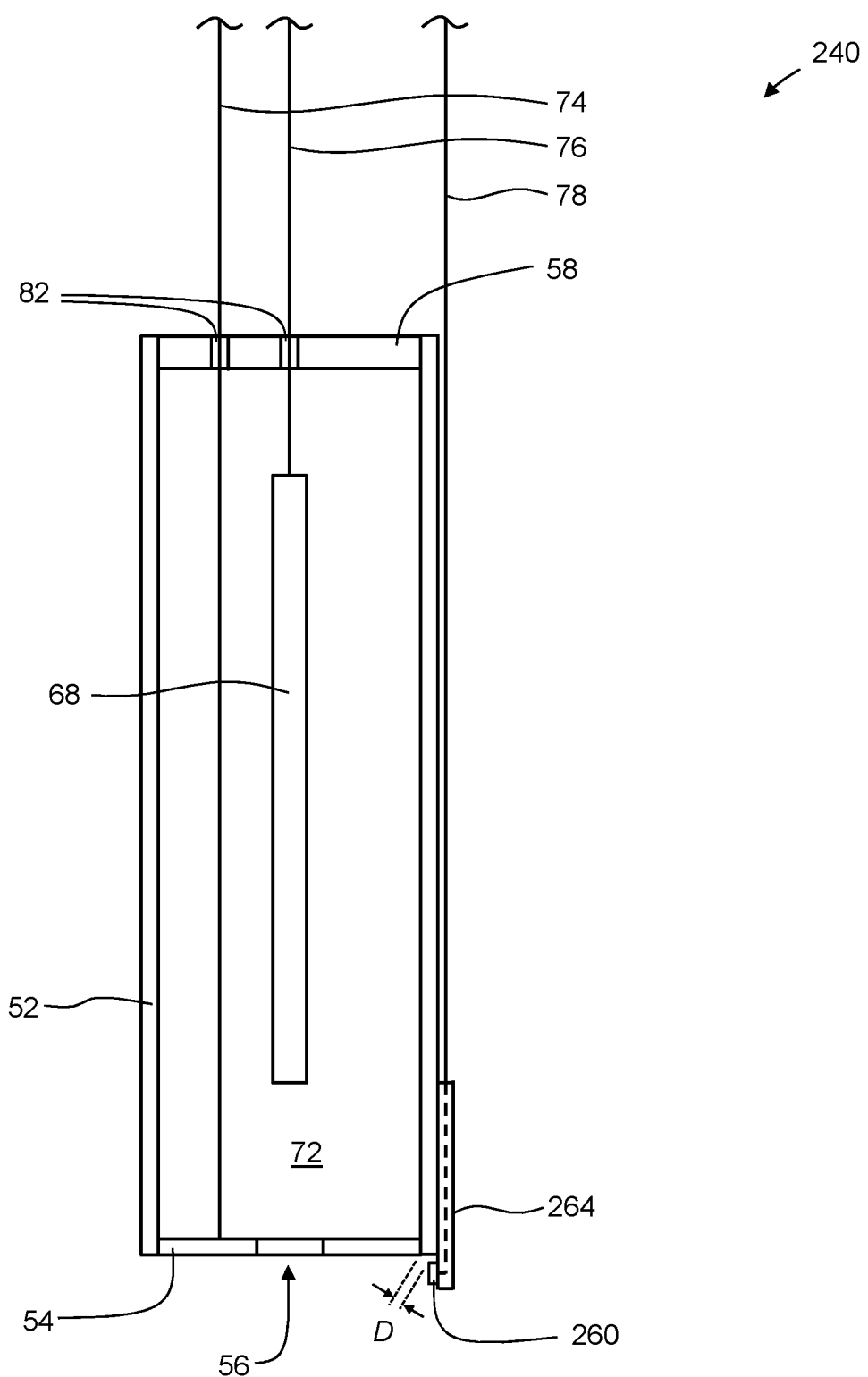
FIG. 7 is a sectional view of still another embodiment of a probe forming part of the apparatus of FIG. 3.

Still other configurations are possible. For example, FIG. 7 shows another embodiment of a probe, which is generally indicated by reference numeral 240. Probe 240 is similar to probe 40 described above and with reference to FIGS. 4 and 5, but comprises a conductive coupon 260 that has a surface exposed to the exterior of the probe 240, and is separated from the steel electrode 54 by a fixed distance, D. Similar to conductive coupon 60 of probe 40, the conductive coupon 260 is fabricated of a conductive material that exhibits potential-pH behavior that is insensitive to the amount of oxygen present. In this embodiment, the conductive coupon 260 is fabricated of antimony (Sb) or an alloy thereof, but may alternatively be fabricated of tungsten (W) or an alloy thereof, or of another material. In this embodiment, the conductive coupon 60 is mounted on a hollow insulating bracket 264 that has a generally linear shape and that is fastened to the body 52 of the probe 240, such that the conductive coupon 260 is isolated from direct electrical contact with the steel electrode 54 by virtue of separation distance D. The conductive coupon 260 and the steel electrode 54 are in proximity with each other, such that the conductive coupon 260 and the steel electrode 54 are less than about ten (10) mm from each other, and preferably within about one (1) to about two (2) mm from each other. The insulating bracket 264 is fabricated of a dielectric material, such as polymer. The probe 240 has an insulated third wire 78 that is electrically connected to the conductive coupon 160, and in the example shown a portion of the insulated third wire 78 is housed in the interior of the insulating bracket 264.

Although in the embodiments described above, a portion of the insulated third wire 78 is housed in the interior of the insulating bracket, in other embodiments, none of the insulated third wire may be housed in the interior of the insulating bracket.

Although in the embodiments described above, the reference electrode is positioned in the interior of the body, in other embodiments, the reference electrode may alternatively be positioned exterior to the body. In one such embodiment, an additional volume of the ionically conductive medium may be positioned exterior to the body, and the exterior reference electrode may be positioned in the additional volume of ionically conductive medium. In another such embodiment, the exterior reference electrode may be positioned in soil exterior to the body.

Figure 8:
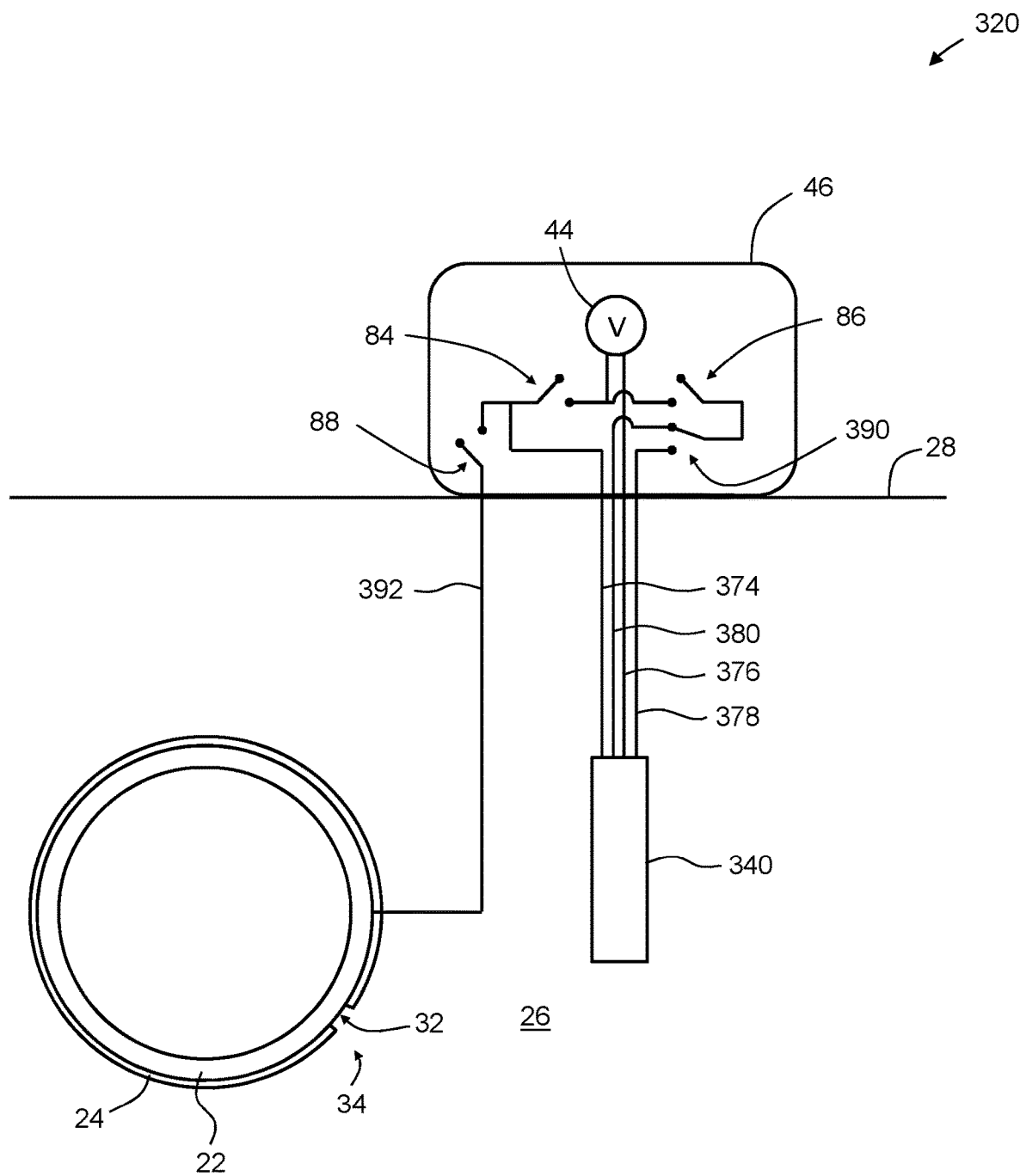
FIG. 8 is a schematic view of another embodiment of an apparatus for measuring a cathodic protection condition of a buried steel structure.

The apparatus is not limited to the configuration described above, and in other embodiments, the other configurations may alternatively be used. For example, FIG. 8 shows an apparatus for measuring a cathodic protection condition of a buried steel structure, which is generally indicated using reference numeral 320. The apparatus 330 is generally similar to apparatus 20 described above and with reference to FIGS. 3 to 5, and is configured to measure the cathodic protection condition of the buried steel structure 22 that is being cathodically protected by the impressed current cathodic protection (ICCP) device (not shown). In the example shown, the buried steel structure 22 is the pipeline covered with the polymer coating 24, and is buried in soil 26 below grade 28. Also in the example shown, the buried steel structure 22 has the exterior surface 32 that is exposed to soil 26 at the coating defect 34, which is in the form of a hole in the polymer coating 24. It will be understood however that the apparatus 320 is not limited to use with pipelines, and may alternatively be used with other buried steel structures, or with underwater steel structures, that are being cathodically protected by either an ICCP device or a galvanic cathodic protection arrangement. As will be understood, underwater steel structures are submerged in an electrolytic medium of seawater or freshwater, and are thereby effectively buried.

The apparatus 320 comprises a probe 340 that is permanently buried in soil 26 adjacent the steel structure 22. The probe 340 is in electrical communication with the potential difference measurement device 44 housed in the enclosure 46 that is situated on grade 28 near the steel structure 22.

Figure 9:
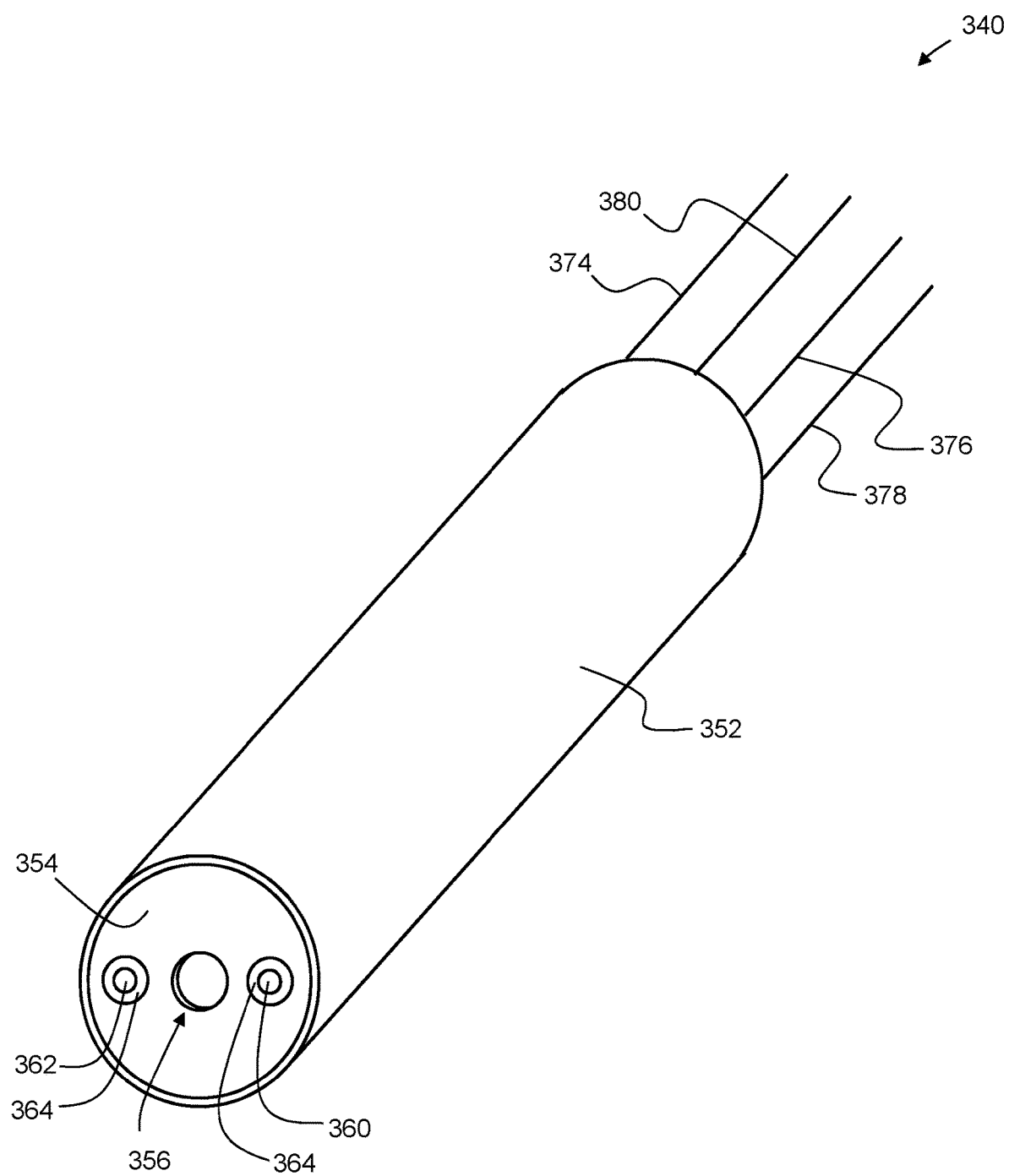
FIG. 9 is a perspective view of a probe forming part of the apparatus of FIG. 8.
Figure 10:
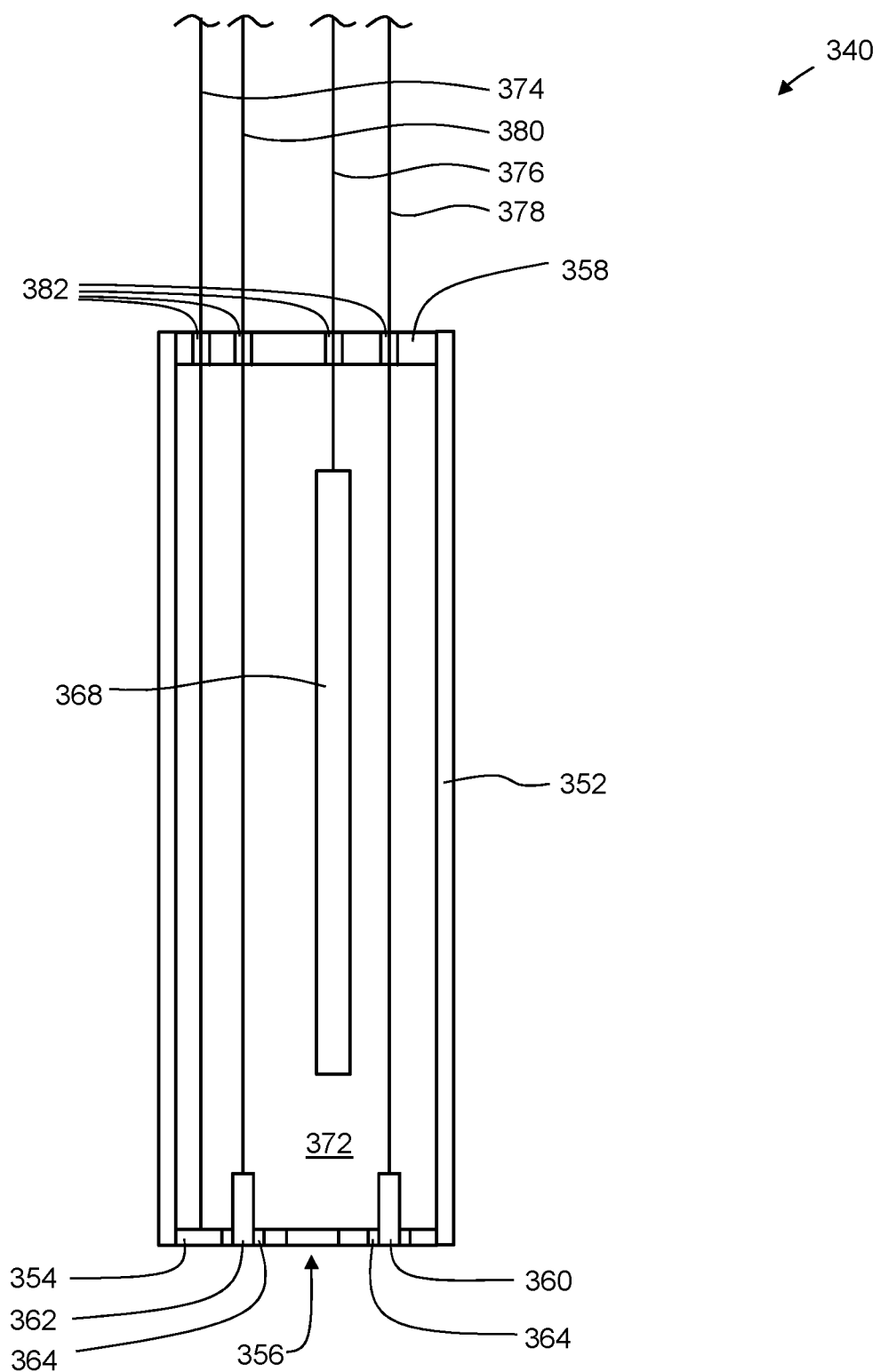
FIG. 10 is a sectional view of the probe of FIG. 9.

The probe 340 may be better seen in FIGS. 9 and 10. Probe 340 comprises an elongate, hollow body 352 that is fabricated of a non-conductive material, and in this embodiment the body 352 is fabricated of polyvinyl chloride (PVC). The body 352 has a first end into which is fitted a steel electrode 354 in the general form of a disc. The steel electrode 354 is sized to have a surface area that is generally commensurate with the area of a typical coating defect on the surface of the steel structure 22, such as coating defect 34. The steel electrode 354 has a central aperture 356 formed therein. The body 352 has a second end that is sealed with a plug 358 fabricated of a non-conductive material, and in this embodiment the plug 358 is fabricated of polyvinyl chloride (PVC).

The probe 340 also comprises a first conductive coupon 360 positioned adjacent the steel electrode 354, and a second conductive coupon 362 positioned adjacent the steel electrode 354, each of which has a surface exposed to the exterior of the probe 340. Additionally, each of the conductive coupons 360 and 362 is fabricated of a different conductive material that exhibits potential-pH behavior that is insensitive to the amount of oxygen present. In this embodiment, the conductive coupon 360 is fabricated of antimony (Sb) or an alloy thereof, and the second conductive coupon 362 is fabricated of tungsten (W) or an alloy thereof. In the embodiment shown, each of the conductive coupons 360 and 362 is partially sheathed by an insulating bushing 364 accommodated in an aperture formed in the steel electrode 354, such that the conductive coupons 360 and 362 are isolated from direct electrical contact with the steel electrode 354 and from direct electrical contact with each other. The insulating bushings 364 are fabricated of a dielectric material, such as polymer. The conductive coupons 360 and 364 are each in proximity with the steel electrode 354, such that each of the conductive coupons 360 and 364 is less than about ten (10) mm from the steel electrode 354, and preferably within about one (1) to about two (2) mm from the steel electrode 354.

The probe 340 further comprises a reference electrode 368 positioned in the interior of the body 352, away from direct electrical contact with the steel electrode 354 and the conductive coupons 360 and 362. In this embodiment, the reference electrode 368 is in the form of a zinc (Zn) "pseudo reference" electrode. The interior of the body 352 is filled with an ionically conductive medium 372, which surrounds the reference electrode 368 and which is in electrolytic communication with the soil 26 surrounding the probe 340 via the aperture 356 formed in the steel electrode 354. In this embodiment, the ionically conductive medium 372 is a blend of bentonite, gypsum and sodium sulfate ($Na_2SO_4$). The conductive coupons 360 and 364, the steel electrode 354 and the reference electrode 368 are in proximity with each other, such that the conductive coupons 360 and 364, the steel electrode 354 and the reference electrode 368 are in electrolytic communication with each other.

The probe 340 has an insulated first wire 374 that is electrically connected to the steel electrode 354, an insulated second wire 376 that is electrically connected to the reference electrode 368, an insulated third wire 378 that is electrically connected to the first conductive coupon 360, and an insulated fourth wire 380 that is electrically connected to the second conductive coupon 362. Each of the first wire 374, the second wire 376, the third wire 378 and the fourth wire 380 extends out of the probe 340 through a respective sealed fitting 382 in the plug 358.

The potential difference measurement device 44 is electrically connected to the reference electrode 368 via the second wire 376 extending from the probe 340. The potential difference measurement device 44 is electrically connectable to the steel electrode 354 via the first interruptible element 84, which is housed in the enclosure 46 and which is connected to the first wire 374. The potential difference measurement device 44 is electrically connectable to the conductive coupons 360 and 362 via the second interruptible element 86, which is housed in the enclosure 46 and which is connected to a selector switch 390, which is configured to be alternately connected to either the third wire 378 or the fourth wire 380.

The probe 340 is also electrically connectable to the steel structure 22 via the third interruptible element 88, which is housed in the enclosure 46 and which is connected to an insulated fifth wire 392 connected to the surface 32 of the steel structure 22 through the polymer coating 24. The third interruptible element 88 is also connected to the second wire 376 that is electrically connected to the steel electrode 354.

In use, when the probe 340 is not being used for measurement, the apparatus 320 is placed into a "non-measurement" configuration, whereby the first interruptible element 84 and the second interruptible element 86 are opened, and the third interruptible element 88 is closed.

When the probe 340 is used for measurement, the apparatus 320 is placed into a "measurement" configuration, whereby the third interruptible element 88 is opened, and either the first interruptible element 84 or the second interruptible element 86 is closed. In this configuration, when the second interruptible element 86 is opened and the first interruptible element 84 is closed, the potential difference measurement device 44 is configured to measure the potential difference between the steel electrode 354 and the reference electrode 368, $E_S$. The measured potential difference $E_S$ can be directly compared to one or more industry standard values to determine cathodic protection effectiveness of the buried steel structure 22. When the first interruptible element 84 is opened and the second interruptible element 86 is closed, the potential difference measurement device 44 is configured to measure the potential difference between either the first conductive coupon 360 or the second conductive coupon 362, and the reference electrode 368 ($E_{C1}$ and $E_{C2}$, respectively), as governed by the position of the selector switch 390. As each of the conductive coupons 360 and 362 is fabricated of a conductive material that exhibits potential-pH behavior that is insensitive to the amount of oxygen present, the measured potential differences $E_{C1}$ and $E_{C2}$ can each be used to estimate the pH at the interface between the surface 32 of the steel structure 22 and soil 26 at the coating defect 34, through comparison of the measured values of potential difference $E_{C1}$ and $E_{C2}$ to potential-pH calibration data for the conductive coupons 360 and 362.

Although in the embodiment described above, the probe 340 comprises two (2) conductive coupons, namely a first conductive coupon 360 and a second conductive coupon, with each of the conductive coupons being fabricated of a different conductive material that exhibits potential-pH behavior that is insensitive to the amount of oxygen present, in other embodiments the probe may alternatively comprise more than two (2) of each of the first or second conductive coupons fabricated of the respective conductive material that exhibits potential-pH behavior that is insensitive to the amount of oxygen present. In one such embodiment, a suitable selector switch configured to be alternately connected to each of the coupons is provided.

Although in the embodiment described above, the probe 340 comprises two (2) conductive coupons, namely a first conductive coupon 360 and a second conductive coupon, with each of the conductive coupons being fabricated of a different conductive material that exhibits potential-pH behavior that is insensitive to the amount of oxygen present, in other embodiments the probe may alternatively comprise more than two (2) conductive coupons, with each being fabricated of a different conductive material that exhibits potential-pH behavior that is insensitive to the amount of oxygen present. In one such embodiment, a suitable selector switch configured to be alternately connected to each of the coupons is provided.

Figure 11:
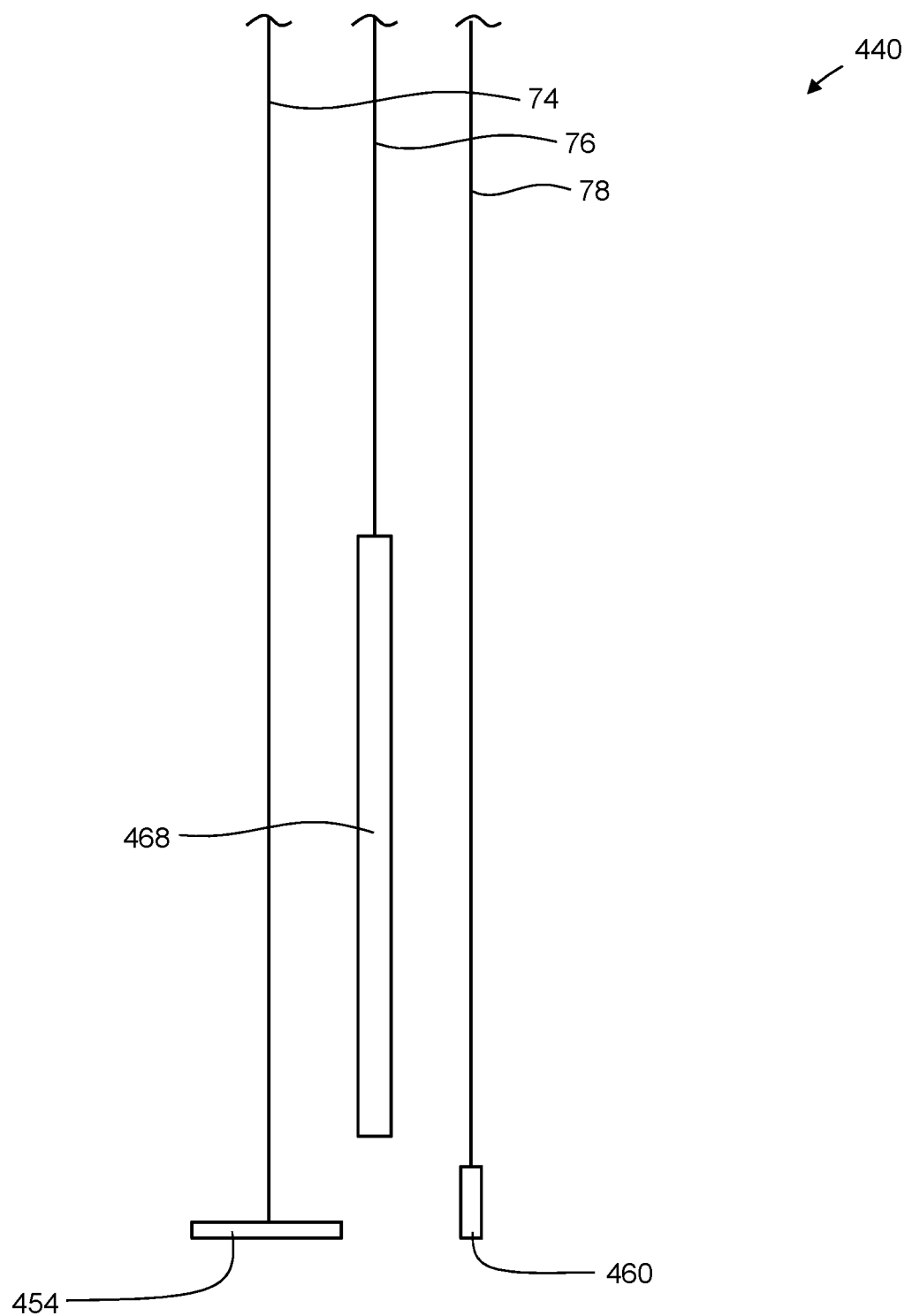
FIG. 11 is a view of still yet another embodiment of a probe forming part of the apparatus of FIG. 3.

Still other probe configurations are possible. For example, FIG. 11 shows another embodiment of a probe forming part of the apparatus 20 described above and with reference to FIG. 3, and which is generally indicated by reference numeral 440. Probe 440 is conceptually similar to probe 40 described above and with reference to FIGS. 4 and 5, but does not comprise an elongate, hollow body. Similar to probe 40, probe 440 is permanently buried in soil 26 adjacent the steel structure 22, and is in electrical communication with the potential difference measurement device 44 housed in the enclosure 46 that is situated on grade 28 near the steel structure 22.

The probe 440 comprises a steel electrode 454 that is positioned in the soil 26 adjacent the steel structure 22. The steel electrode 454 is sized to have a surface area that is generally commensurate with the area of a typical coating defect on the surface of the steel structure 22, such as the coating defect 34.

The probe 440 also comprises a conductive coupon 460 that is positioned in the soil 26 adjacent the steel structure 22, and in proximity with the steel electrode 454. The conductive coupon 460 is fabricated of a conductive material that exhibits potential-pH behavior that is insensitive to the amount of oxygen present. In this embodiment, the conductive coupon 460 is fabricated of antimony (Sb) or an alloy thereof, but may alternatively be fabricated of tungsten (W) or an alloy thereof, or of another material. The conductive coupon 460 is spaced from the steel electrode 454, such that the conductive coupon 460 is isolated from direct electrical contact with the steel electrode 454. The conductive coupon 460 and the steel electrode 454 are in proximity with each other, such that the conductive coupon 460 and the steel electrode 454 are less than about ten (10) mm from each other, and preferably within about one (1) to about two (2) mm from each other.

The probe 440 further comprises a reference electrode 468 that is positioned in the soil 26 adjacent the steel structure 22, and in proximity with each of the steel electrode 454 and the conductive coupon 460. In this embodiment, the reference electrode 468 is in the form of a zinc (Zn) "pseudo reference" electrode. The reference electrode 468 is spaced from each of the steel electrode 454 and the conductive coupon 460, such that the reference electrode 468 is isolated from direct electrical contact with each of the steel electrode 454 and the conductive coupon 460. As will be understood, the soil 26 surrounds the reference electrode 468, the steel electrode 454 and the conductive coupon 460, and provides an ionically conductive medium for operation of the probe 440. The conductive coupon 460, the steel electrode 454 and the reference electrode 468 are in proximity with each other, such that the conductive coupon 460, the steel electrode 454 and the reference electrode 468 are in electrolytic communication with each other.

The probe 440 has the insulated first wire 74 that is electrically connected to the steel electrode 454, the insulated second wire 76 that is electrically connected to the reference electrode 468, and the insulated third wire 78 that is electrically connected to the conductive coupon 460.

Although in the embodiments described above, the potential difference measurement device is housed in an enclosure that is situated on grade near the buried steel structure, in other embodiments, the potential difference measurement device may alternatively be housed in an enclosure situated below grade, or may alternatively not be situated in any enclosure. For example, the potential difference measurement device may alternatively be portable and carried by a worker, and be electrically connectable to the ends of one or more wires electrically connected or connectable to the probe and/or electrically connected or connectable to the buried steel structure, and which are accessible to the worker.

Although in the embodiments described above, the potential difference measurement device is electrically connected to the reference electrode, in other embodiments, the potential difference measurement device may alternatively be electrically connectable to the reference electrode via one or more intervening elements, such as for example an additional interrupting means such as a switch.

Although in the embodiments described above, components of the probe and the buried steel structure are indicated as being electrically connected or electrically connectable to the potential difference measurement device, it will be understood that the term "in electrical communication with" encompasses both "electrically connected to" and "electrically connectable to".

Although in the embodiments described above, the reference electrode is in the form of a zinc (Zn) "pseudo reference" electrode, in other embodiments, the reference electrode may alternatively be any of a copper-copper sulfate electrode (CSE), a saturated calomel electrode (SCE), a silver-silver chloride electrode, and the like.

Although in embodiments described above, the steel electrode has a central aperture formed therein, in other embodiments, the steel electrode may alternatively comprise a plug fabricated of a porous material that provides electrolytic communication between the interior of the probe body and the soil surrounding the probe.

Although in embodiments described above, the apparatus is configured to measure the cathodic protection condition of a buried steel structure that is being cathodically protected by an impressed current cathodic protection (ICCP) device, where in the example shown the buried steel structure is a pipeline buried in soil, the reference electrode is in the form of a zinc (Zn) "pseudo reference" electrode, and the interior of the probe body is filled with an ionically conductive medium that is a blend of bentonite, gypsum and sodium sulfate ($Na_2SO_4$), in other embodiments in which the buried steel structure is underwater, the reference electrode would be of a different type (e.g. silver-silver chloride electrode) depending on water chemistry and/or water composition, and the ionically conductive medium may also be different.

The following example illustrates an application of the above-described embodiment.

EXAMPLE 1

Potential-pH measurement testing was carried out by immersing an exemplary antimony (Sb) electrode in aqueous solutions having various pH values. A voltmeter was used to measure the potential difference, E, between the Sb electrode and a copper sulfate electrode (CSE) serving as a reference electrode.

Aerated conditions were obtained by continuously bubbling air through the solutions during potential difference measurement. Unaerated conditions were obtained by not bubbling air through the solutions during potential difference measurement.

Figure 12:
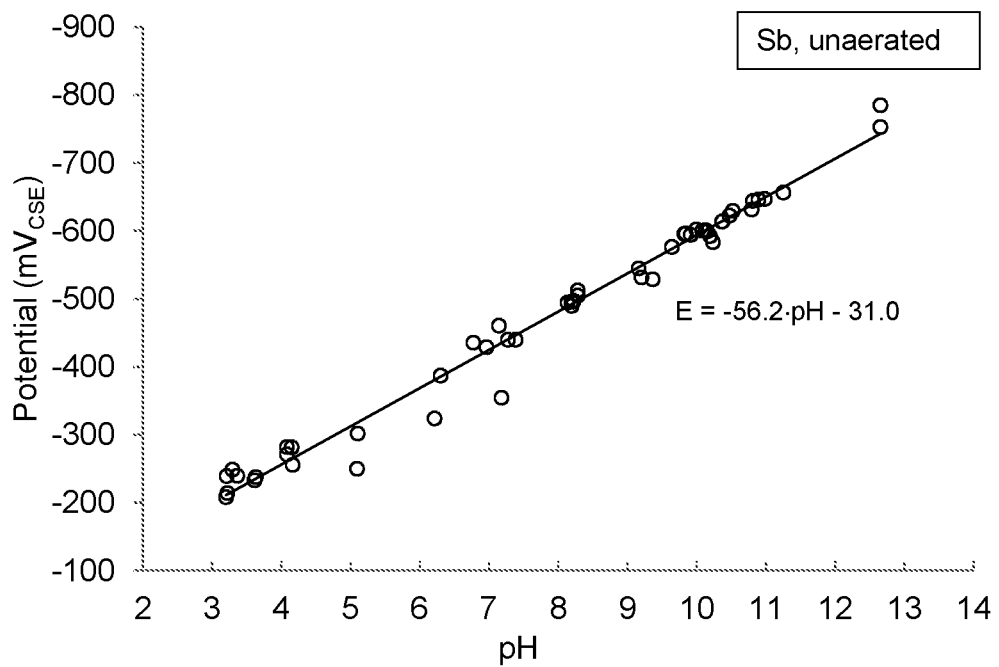
FIGS. 12 and 13 are graphical plots of measured potential as a function of pH for an exemplary antimony electrode for unaerated and aerated conditions, respectively.
Figure 13:
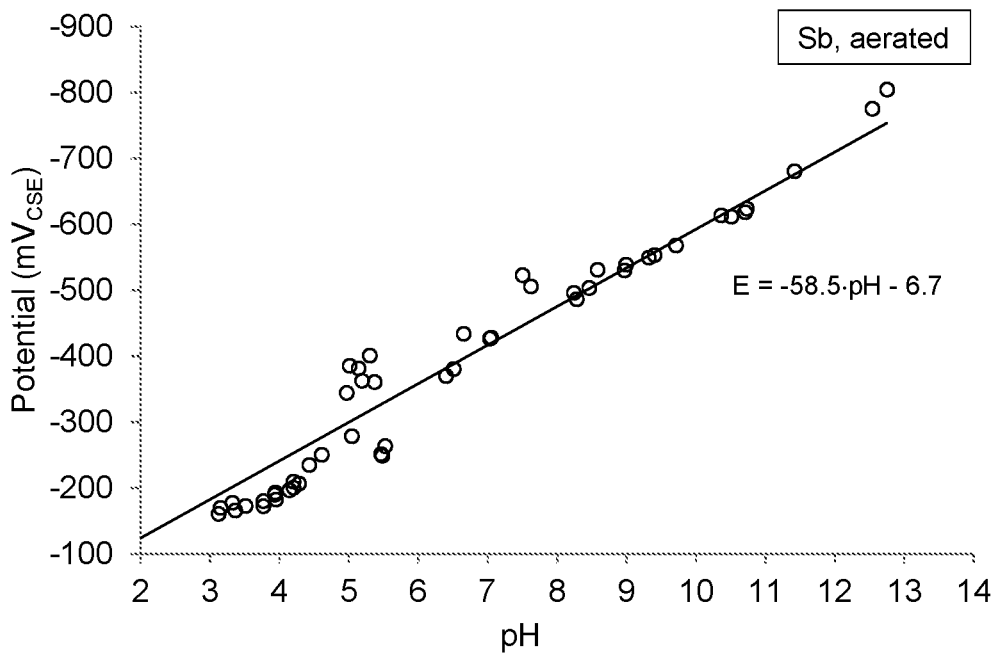

FIGS. 12 and 13 are graphical plots of measured potential of the Sb electrode as a function of pH for the unaerated and aerated conditions, respectively. For the unaerated condition, the measured potential was observed to fit a linear relationship of $E=-56.2 \cdot pH - 31.0$. For the aerated condition, the measured potential was observed to fit a linear relationship of $E=-58.5 \cdot pH - 6.7$.

As will be appreciated, the difference in measured Sb electrode potential between the unaerated and aerated conditions was negligible over the pH range tested. Moreover, the relationship between the measured Sb electrode potential and pH was observed to be linear for both the unaerated and aerated conditions over the pH range tested. As will be understood, these exemplary results demonstrate the efficacy of using Sb as a coupon material which exhibits potential-pH behavior that is generally insensitive to the amount of oxygen present.

Although embodiments have been described above with reference to the accompanying drawings, those of skill in the art will appreciate that variations and modifications may be made without departing from the scope thereof as defined by the appended claims.

What is claimed is:

1. A probe for measuring a cathodic protection condition of a buried steel structure, the probe comprising:
    an elongate, non-conductive body having an interior accommodating an ionically conductive medium comprising components that are solid;
    a steel electrode disposed on an end of the body and having a first aperture and a second aperture formed therein, the second aperture being offset from a center of the steel electrode;
    a reference electrode; and
    a coupon fabricated of a conductive material,
    the steel electrode, the reference electrode and the conductive coupon being positioned in proximity with each other and isolated from direct electrical contact with each other, the solid components of the ionically conductive medium surrounding the reference electrode and the solid components of the ionically conductive medium being in direct contact with the steel electrode.

2. The probe of claim 1, wherein the conductive material exhibits potential-pH behavior that is insensitive to an amount of oxygen present.

3. The probe of claim 1, wherein the conductive material is selected from the group consisting of: antimony; antimony alloys; tungsten; and tungsten alloys.

4. The probe of claim 1, wherein the reference electrode is selected from the group consisting of a zinc electrode, a copper-copper sulfate electrode (CSE), a saturated calomel electrode (SCE), and a silver-silver chloride electrode.

5. The probe of claim 1, wherein the first aperture is configured for providing electrolytic communication between the conductive medium and an exterior of the probe.

6. The probe of claim 1, wherein a portion of the conductive coupon is sheathed by an insulating bushing, the bushing being accommodated in the second aperture formed in the steel electrode.

7. The probe of claim 1, wherein the ionically conductive medium comprises a blend of bentonite, gypsum and sodium sulfate ($Na_2SO_4$).

8. The probe of claim 1, wherein the first aperture is a central aperture formed at the center of the steel electrode.

9. The probe of claim 8, wherein the conductive coupon is accommodated in the second aperture formed in the steel electrode.

10. The probe of claim 1, wherein the steel electrode has an outwardly-facing area at the end of the body, a center of the outwardly-facing area coinciding with the center of the steel electrode, wherein the first aperture and the second aperture extend through the outwardly-facing area.

11. An apparatus for measuring a cathodic protection condition of a buried steel structure, the apparatus comprising:
    a probe configured to be buried adjacent the steel structure, the probe comprising:
    a steel electrode,
    a reference electrode positioned in proximity to the steel electrode,
    a coupon fabricated of a conductive material, and
    an elongate, non-conductive body having an interior accommodating an ionically conductive medium comprising components that are solid, the steel electrode, the reference electrode and the conductive coupon being positioned in proximity with each other and isolated from direct electrical contact with each other, the solid components of the ionically conductive medium surrounding the reference electrode, the solid components of the ionically conductive medium being in direct contact with the steel electrode, the steel electrode being disposed on an end of the body and having a first aperture and a second aperture formed therein, the second aperture being offset from a center of the steel electrode; and a potential difference measurement device in electrical communication with the reference electrode, and with one of:

the steel electrode, and the conductive coupon.

12. The apparatus of claim 11, wherein the potential difference measurement device is in electrical communication with the steel electrode by a first interruptible means and is in electrical communication with the conductive coupon by a respective second interruptible means.

13. The apparatus of claim 12, wherein the first interruptible means is a mechanical switch and the second interruptible means is a mechanical switch.

14. The apparatus of claim 11, wherein the probe is configured to be in electrical communication with the buried steel structure by a respective interruptible means.

15. The apparatus of claim 14, wherein the steel electrode is configured to be in electrical communication with the buried steel structure by the interruptible means.

16. The apparatus of claim 11, wherein the potential difference measurement device is accommodated in an enclosure on a ground surface.

17. A method of measuring a cathodic protection condition of a buried steel structure receiving a cathodic protection current, the method comprising:

electrically connecting the steel structure to a steel electrode of a probe buried adjacent the steel structure, the probe comprising an elongate, non-conductive body having an interior accommodating an ionically conductive medium, the steel electrode being disposed on an end of the body and having a first aperture and a second aperture formed therein, the second aperture being offset from a center of the steel electrode, the probe further including a conductive coupon fabricated of a conductive material and a reference electrode, wherein the steel electrode, the reference electrode and the conductive coupon are positioned in proximity with each other; and temporarily interrupting the electrical connection between the steel structure and the steel electrode and measuring a potential difference between the reference electrode and one of:

the steel electrode, and the conductive coupon, the steel electrode, the reference electrode and the conductive coupon being positioned in the ionically conductive medium and isolated from direct electrical contact with each other, the ionically conductive medium comprising components that are solid, the solid components of the ionically conductive medium surrounding the reference electrode and the solid components of the ionically conductive medium being in direct contact with the steel electrode.

18. The method of claim 17, further comprising:

after said measuring, electrically connecting the steel structure to the steel electrode.

19. The method of claim 17, further comprising determining cathodic protection effectiveness of the steel structure by comparing the potential difference measured between the reference electrode and the steel electrode to one or more industry standard values.

20. The method of claim 17, further comprising determining pH at an interface between a surface of the steel structure and the conductive medium by comparing the potential difference measured between the reference electrode and the conductive coupon to potential-pH calibration data for the conductive coupon.

* * * * *